United States Patent

[11] 3,617,025

| [72] | Inventors | Charles C. Gerbic<br>San Anselmo;<br>Terrence V. Molloy, Pinole, both of Calif. |
|---|---|---|
| [21] | Appl. No. | 52,445 |
| [22] | Filed | July 6, 1970 |
| [45] | Patented | Nov. 2, 1971 |
| [73] | Assignee | Grove Valve and Regulator Company<br>Oakland, Calif. |

[54] BALL VALVE WITH RETRACTABLE SEAT RINGS
8 Claims, 3 Drawing Figs.

[52] U.S. Cl. .................................................... 251/172,
251/315
[51] Int. Cl. ..................................................... F16k 25/00
[50] Field of Search........................................... 251/159,
172, 315; 137/246.22

[56] References Cited
UNITED STATES PATENTS

| 3,007,490 | 11/1961 | Passmore ...................... | 251/172 X |
| 3,315,697 | 4/1967 | Oliver ........................... | 137/246.22 |
| 3,421,733 | 1/1969 | Stewart ......................... | 251/172 |

Primary Examiner—Harold W. Weakley
Attorney—Melvin R. Stidham

ABSTRACT: A valve seat ring seals against a valve closure on a main sealing diameter. A trailing seal ring and an intermediate seal ring seal between the seat ring and the body on diameters respectively smaller than and larger than the main seal diameter. The annular area between these seal diameters is opposed, at least in part, at the front of the seat ring by body space pressure at a level intermediate the upstream and downstream pressure. This provides a force differential that biases the seat ring forward to seal or rearward to retract, depending upon whether upstream or downstream pressure is introduced between the seal rings.

INVENTOR.
CHARLES C. GERBIC
TERRENCE V. MOLLOY

FIG-2-

BALL VALVE WITH RETRACTABLE SEAT RINGS

BACKGROUND OF THE INVENTION

This invention relates to a valve with retractable seats and, more particularly to a valve for regulating service wherein the seat rings may be retracted for free, incremental operation of the valve.

There is a growing demand for regulator valves having high flow capacity, and ball valves are seeing increased use for this application. However, when it is desired to turn the ball through a particular increment of movement, the drag of the seat ring against the ball renders it virtually impossible to achieve precision control. If the system controller signals for rotation through a given angle, the drag of the seat will resist turning while torque builds up. Then, when friction is finally overcome, inertia may carry the ball past the desired angle. Thus, there is a tendency for such regulator valves to hunt or cycle as they seek precision control.

Such ball valves are utilized in flow control systems with seats secured back in spaced relationship to the ball in order to facilitate operation. However, such valves are operated only through a range of open positions and, of course, shutoff cannot be achieved with clearances providing a flow path between the seats and the ball.

Other valves, including ball valves have been provided with seat rings which are retracted hydraulically through a separate hydraulic system. Such a ball valve is shown in U.S. Pat. No. 3,463,448, granted Aug. 26, 1969 to Jack E. Piccardo and has proved to be a commercial success for on-off operation. However, such valves depend upon the availability of a separate hydraulic system which can overcome pressures acting against the seats to retract them by brute force. It is highly desirable to provide for extension and retraction of the seats by use of pressures available in the line in which the valve is installed.

OBJECTS OF THE INVENTION

It is an object of this invention to provide a valve with retractable seat rings actuated by available line pressures.

It is a further object of this invention to provide seat rings for a regulating valve, which seat rings may be urged into sealing engagement when the valve is closed and retracted while the valve is being operated.

It is a further object of this invention to provide a regulating valve with seat rings which are automatically retracted while the valve is operating.

Other objects and advantages will become apparent from the detailed description to follow, particularly when read in conjunction with the accompanying drawing.

DETAILED DESCRIPTION OF A PREFERRED EMBODIMENT

Figure 1:
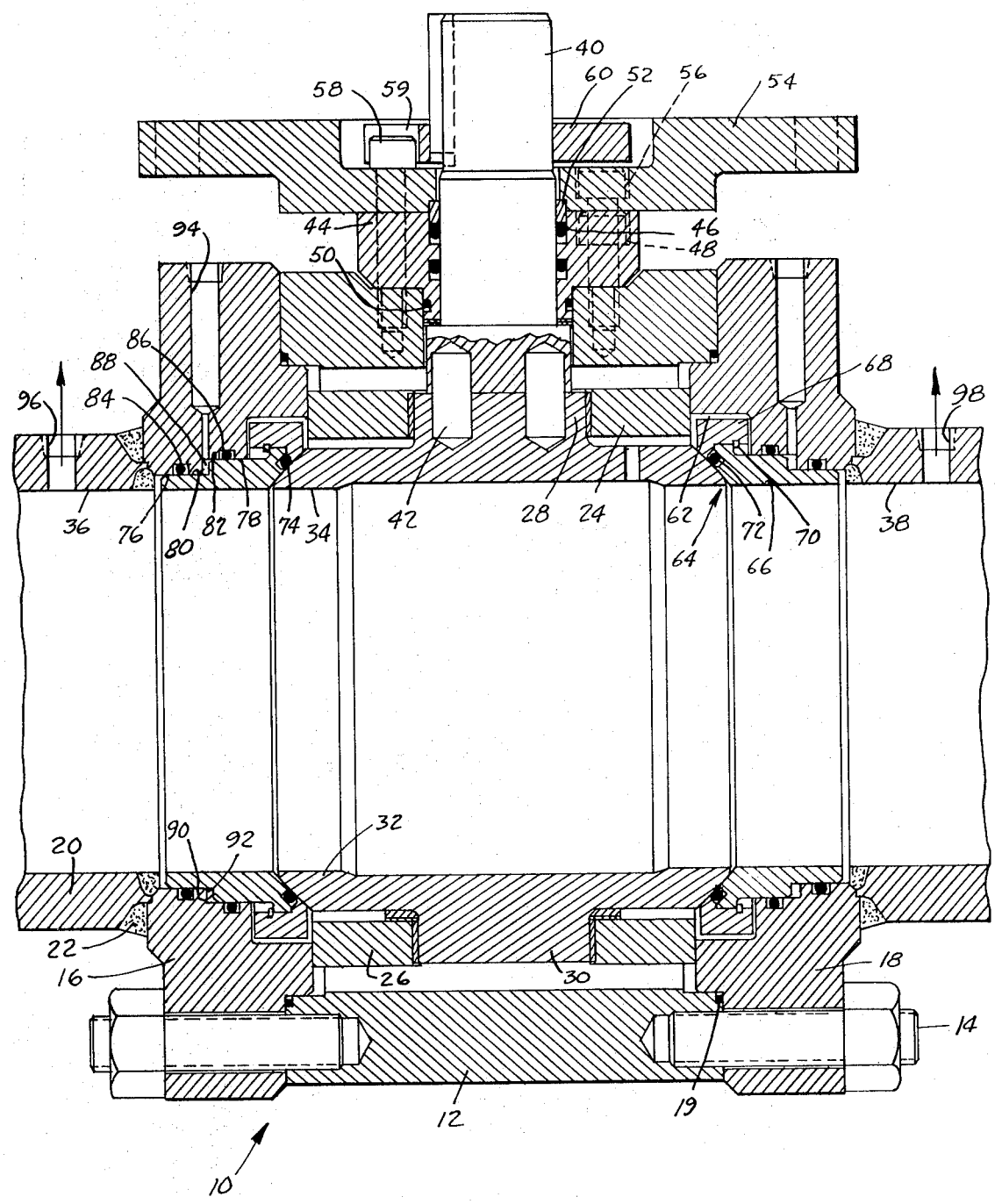
FIG. 1 is a vertical section view of a ball valve embodying features of this invention.

Referring now more particularly to FIG. 1, the ball valve 10 constructed in accordance with this invention may include a body band 12 which may be cast or rolled from metal plate. Secured to the opposite annular faces of the body band 12, as by means of studs 14, are end closures 16 and 18 which are sealed off by body O-rings 19. Hubs 20 are welded at 22 to the end closures 16 and 18 and would include some means, such as flanges (not shown) for attachment into a pipeline. Upper and lower bearing blocks 24 and 26 are clamped between the end closures 14 and 16 to rotatably receive trunnions 28 and 30 which may be formed integral with the ball 32.

A flow passage 34 through the ball is aligned with the hub flow passages 36 and 38 when the ball is turned to the open position shown in FIG. 1. An operating stem 40 is coupled to the upper trunnion 28 by means of pins 42, so that by turning the stem through 90°, the ball 32 may be moved between open and closed positions. When the valve is used for regulating purposes, it may be moved through any increment of movement between the open and closed positions. The stem 40 is rotatably received in a stem seal block 44, and O-rings 46 carried therein seal around it. The block is secured to the body band 12, as by means of cap screws 48, and O-rings 50 are provided to render it fluidtight. After a retainer ring 52 is placed for retention of the upper O-ring 46, a valve operator mounting block 54 is secured in place by means of cap screws 56 and 58. The longer cap screw 58 serves as a stop and is engaged by the ends of an arcuate slot 59 formed in a stop plate 60 which is keyed onto the stem 40.

A recess 62 formed in each end closure receives a seat ring assembly 64 which may be formed of inner and outer seat rings 66 and 68 which are held together by a snap ring 70 carried in a groove in the outer seat ring 68. An O-ring 72 carried in a recess 74 formed between the inner and outer seat rings 66 and 68 provides the main seal for sealing engagement with the ball 32.

The end closures 16 and 18 are bored and counterbored to form stepped internal, trailing and intermediate cylindrical surfaces 76 and 78, which slidably receive complementary, trailing and intermediate external surfaces 80 and 82 on the inner seat ring. O-rings 84 and 86 seal between the complementary cylindrical sliding surfaces to form a sealed fluidtight chamber 88 between opposing annular shoulders 90 and 92 on the seat ring and end closures respectively. Fluid ducts 94 drilled through the end closures 16 and 18 each open into a chamber 88 on the upstream and downstream sides, each such duct being adapted for communication with ports 96 and 98 formed in the upstream and downstream flow passages, as will hereinafter be described in detail.

Particularly when a valve is used for regulating service, it is desirable to turn the ball through finite increments of movement with a minimum amount of drag which would impede the accuracy of the controlled movement. Accordingly, it is a feature of this invention that the seat rings 64 are biased toward the ball when the valve is in sealing position but may be retracted to facilitate operation of the ball.

Figure 2:
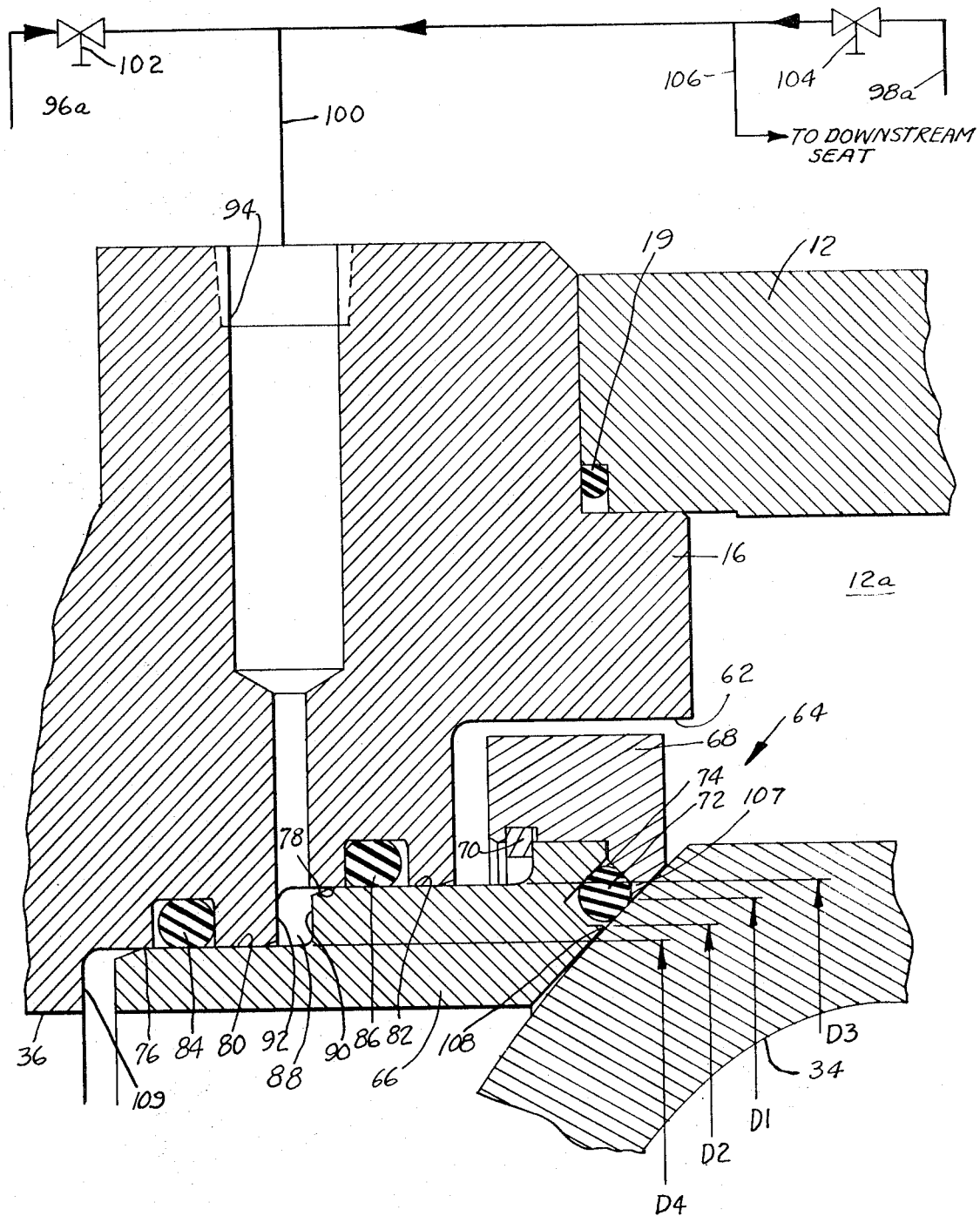
FIG. 2 is an enlarged partial section view of one embodiment of the seat ring assembly; and, FIG. 3 is an enlarged section view of another embodiment of the seat ring assembly.

Referring now more particularly to FIG. 2, the fluid duct 94 within the end closure 16, which opens into the chamber 88 is connected by suitable conduits 100 to lines 96a and 98a, which are tapped into the upstream and downstream lines, respectively. Valves 102 and 104 may be operated selectively to direct upstream or downstream fluid to the conduit 100 and chamber 88 as desired. While just one seat ring assembly 64 is illustrated in FIG. 2, a suitable conduit 106 is provided for communication to the duct 94 opening to the other seat assembly.

The diameters D1 and D2 represent the maximum and minimum main sealing diameters effected by the main O-ring 72. That is, on the upstream side 36, the higher line pressure acts against the front of the seat ring and through the resilient material of the O-ring 72 out to a diameter D1 somewhere adjacent the outer lip 107 of the O-ring recess 74. Outward of the diameter D1 the pressure of fluid in the body space 12a (body pressure) will act against the front of the seat ring. Conversely, on the downstream seat ring, the greater pressure is normally that in the body space 12a, in which case, the higher body pressure will be asserted in front of the seat ring 64 inward to a diameter D2 approximating that of the inner recess lip 108. Hence, on both upstream and downstream seat rings body pressure acts against the front of the seat ring, at least over the area outside of the diameter D1.

Because the trailing O-ring 84 seals on a smaller diameter D3, then any possible main seal rings diameter D2 and the intermediate O-ring 86 seals on a diameter D4 larger than any possible main seal ring diameter D1, there is always an area differential between the front and rear of the seat ring which will cause the seat ring 64 to be biased either toward or away from the ball 43, depending upon the relative pressure within the chamber 88. If the seat ring 64 shown in FIG. 2 is the upstream seal ring, the line pressure which acts against the front of the seat ring out to the maximum seal diameter D1, is opposed by a pressure in the chamber 88 asserted out to the diameter D3, i.e., the diameter of the intermediate seal ring 86. Hence, if the upstream control valve 102 is opened and the downstream control valve 104 is closed, the back of the seat ring 64 will be biased by upstream pressure in the chamber 88 out to the diameter D3, leaving an annular area between the diameters D1 and D3 in which body pressure at the front is opposed by the higher upstream pressure. Hence, the force asserted by the body pressure at the front of the seat ring 64 will be overcome and the seat ring will be biased toward the valve into the position shown in FIG. 2.

If, on the other hand, the upstream control valve 102 is closed and the downstream control valve 104 is opened, the downstream pressure within the chamber 88 will be overcome by the higher upstream pressure acting over the area between diameters D4 and D1 supplemented by the intermediate body space pressure acting over the area between diameters D3 and D1. Hence, the seat rings 64 will be retracted to the position shown in FIG. 3. A shoulder 109 on the valve on the valve body closure 16 limits the amount of retraction to minimize the minimum flow by the seats and thereby maximize the range of correction.

On the downstream side, where the pressure in the body space 12a is normally greater than that in the line 36, the body pressure will act against the front of the seat ring inward approximately to the diameter D2. Opposing this will be the pressure in the chamber 88 acting inward to the diameter D2. Hence, if upstream pressure is introduced into the chamber 88, it will oppose and overcome the relatively low downstream line pressure acting against the area between diameters D4 and D2 and body space pressure acting between diameters D2 and D3. Accordingly, the seat ring 64 will engage the ball 32. If downstream pressure is introduced to the chamber 88, it will be opposed and overcome by the body space pressure between diameters D3 and D2. Hence, the seat rings 64 will retract.

Figure 3:
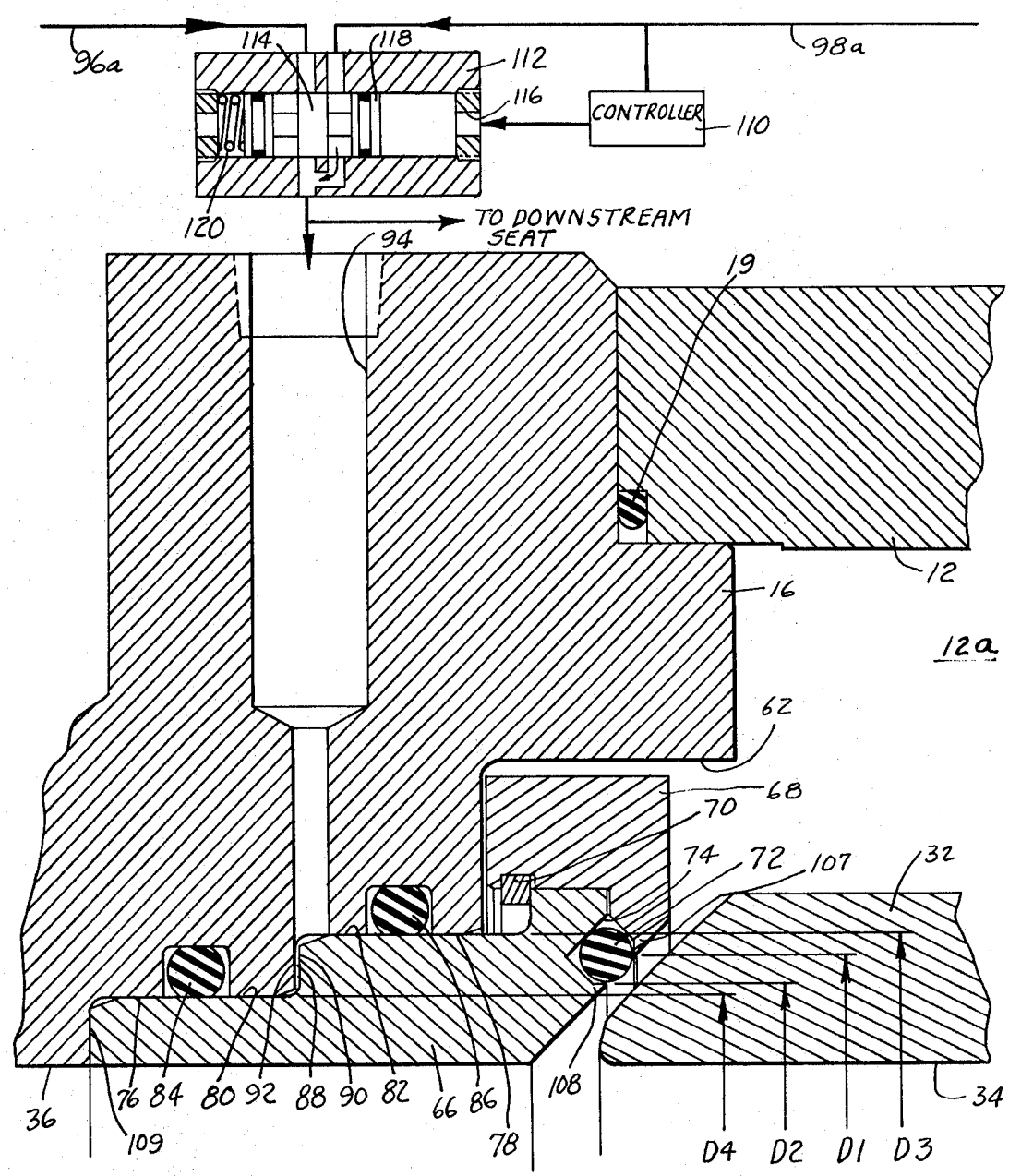

Referring further to FIG. 3, there is shown an arrangement wherein the seat rings 64 may be retracted automatically when the valve is operated as a regulator. Connected to some point in the system is a controller 110 which is adapted to transmit a pressure fluid signal over a range of pressure levels that vary in accordance with the variance of a particular fluid characteristic, e.g., pressure. For example, a controller may generate fluid pressure signals ranging from 3 to 5 p.s.i., with either the maximum or minimum signal being set to initiate regulation. Thereafter, the setting of the regulator increases as the signal increases or decreases in level toward the other end of the range. Assume in this instance that the minimum signal initiates regulation and that this signal is transmitted to a piston operated spool valve 112 to move the spool 114 and connect the duct to either the upstream or downstream line 96a or 98a, The signal is introduced through a port 116 against a piston 118. Movement of the piston 118 may be opposed by a coil spring 120. Hence, as long as the signal is great enough to indicate that correction to the system is required, the spool 114 will be positioned to the left and the duct connected to the downstream line 96a so that the seat ring 64 is retracted for free movement of the ball 32. However, when the signal is reduced to the level indicating that the ball valve 10 should be closed, the spring 120 will overcome the piston 118 and drive the spool 114 to the right. This will open the duct 94 to upstream pressure whereby the seat ring 64 will be forced into engagement with the ball 32 in the position shown in FIG. 2.

While this invention has been described in conjunction with preferred embodiments thereof, it is obvious that modifications and changes therein may be made by those skilled in the art without departing from the spirit and scope of this invention.

What is claimed is:

1. In a valve construction including:
    a valve body having inlet and outlet flow passages therethrough,
    a flow-blocking member movable in said body through a range of movements to block said flow passages in varying degrees,
    a seat ring assembly in said body around one of said flow passages movable axially into engagement with said flow-blocking member, and
    a sealing ring on said seat ring operative to engage said blocking member on an effective sealing diameter.
   the improvement comprising:
    an external trailing cylindrical surface on said seat ring of a diameter less than said effective sealing diameter,
    a complementary trailing surface on said body slidably receiving said trailing external surface,
    an axially intermediate external cylindrical surface on said seat ring of a diameter larger than said effective sealing diameter,
    a complementary intermediate surface on said body slidably receiving said intermediate external surface,
    means sealing between each of said external surfaces and its complementary surface forming a fluidtight chamber between said intermediate external surface and said trailing complementary surfaces, and
    fluid duct means for connecting said chamber to a source of pressure lower than that in said inlet flow passage during movement of said flow-blocking member.

2. The valve construction defined by claim 1 wherein said last-named means comprises:
    a first line connected to said outlet passage, and
    valve means for connecting said first line to said chamber.

3. The valve construction defined by claim 2 including:
    a second line connected to said inlet passage, and
    valve means for connecting said second line to said chamber.

4. The valve construction defined by claim 2 including:
    a second seat ring assembly of like construction around the other of said flow passages whereby the pressure of fluid in said body between said seat rings is asserted against the fronts of said seat ring assemblies inward to a main seal diameter less than that of the complementary intermediate surface.

5. The valve construction defined by claim 4 including:
    a second line connected to said inlet passage, and valve means for connecting said second line to said chambers.

6. The valve construction defined by claim 2 including:
    a second line connected to said inlet passage,
    said valve means comprising a three-way valve movable into first and second positions connecting said chamber with said first and second lines, respectively.

7. The valve construction defined by claim 6 including:
    a control device for producing a range of signals varying in magnitude in accordance with the magnitude of a fluid characteristic.
    means connected to said three-way valve for moving said valve into said second position only when said signal is at one predetermined end of said range.

8. The valve construction defined by claim 1 including:
    stop means on said body for restricting movement of said seat ring assembly away from said flow-blocking member.